PRIOR ART

ONE MICRON

ONE MICRON

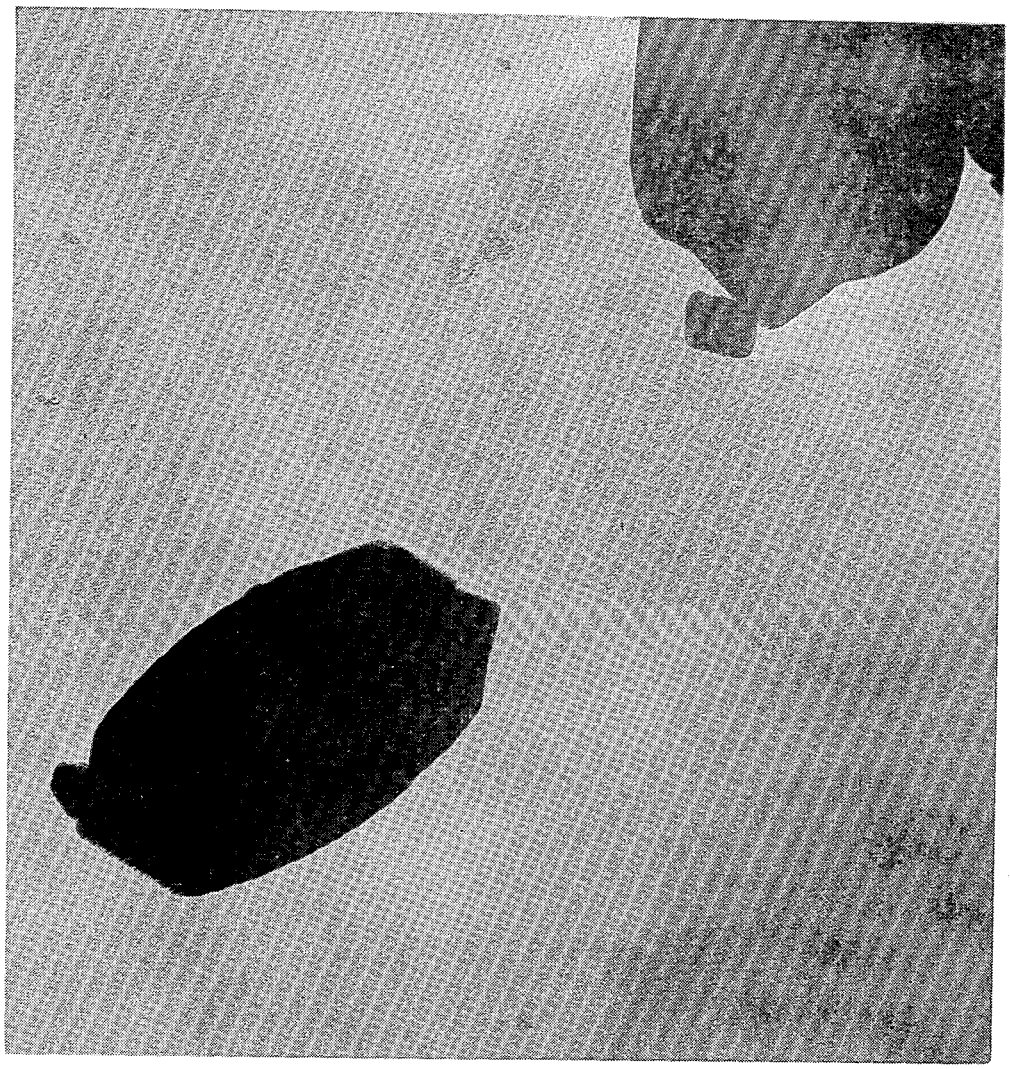
 0.1 MICRON     Fig.6

United States Patent Office 3,320,026
Patented May 16, 1967

3,320,026
METHOD OF PREPARING CALCITE AND THE PRODUCT THEREOF
William F. Waldeck, Milford, N.J., assignor to Chas. Pfizer & Co., Inc., New York, N.Y., a corporation of Delaware
Filed Feb. 20, 1964, Ser. No. 346,349
16 Claims. (Cl. 23—66)

This invention is concerned with calcium carbonate, and more particularly with a calcite of novel crystal habit, and processes for its preparation and use.

Calcium carbonate can be precipitated in any of three isomorphous crystal groups, the calcite, aragonite and vaterite groups. When obtained in calcite form, calcium carbonate ordinarily assumes either a rhombohedral or a scalenohedral habit. Now, however, an especially valuable calcite of novel habit has been obtained, differing from all known naturally occurring minerals or previously reported synthetic products. X-ray analysis establishes the fact that the new calcium carbonate is of the calcite group, but the distinctive nature of its crystalline habit will be clear from the accompanying illustrations, which are photographic reproductions of highly magnified electro micrographs.

Figure 1:
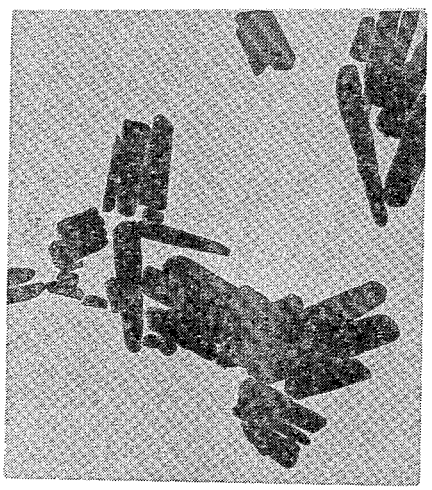
Figure 2:
Figure 3:
Figure 4:
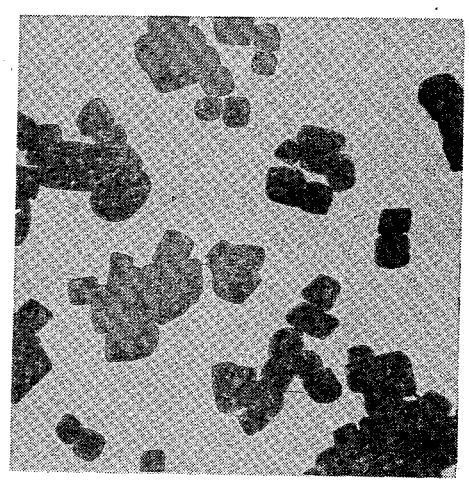
Figure 5:
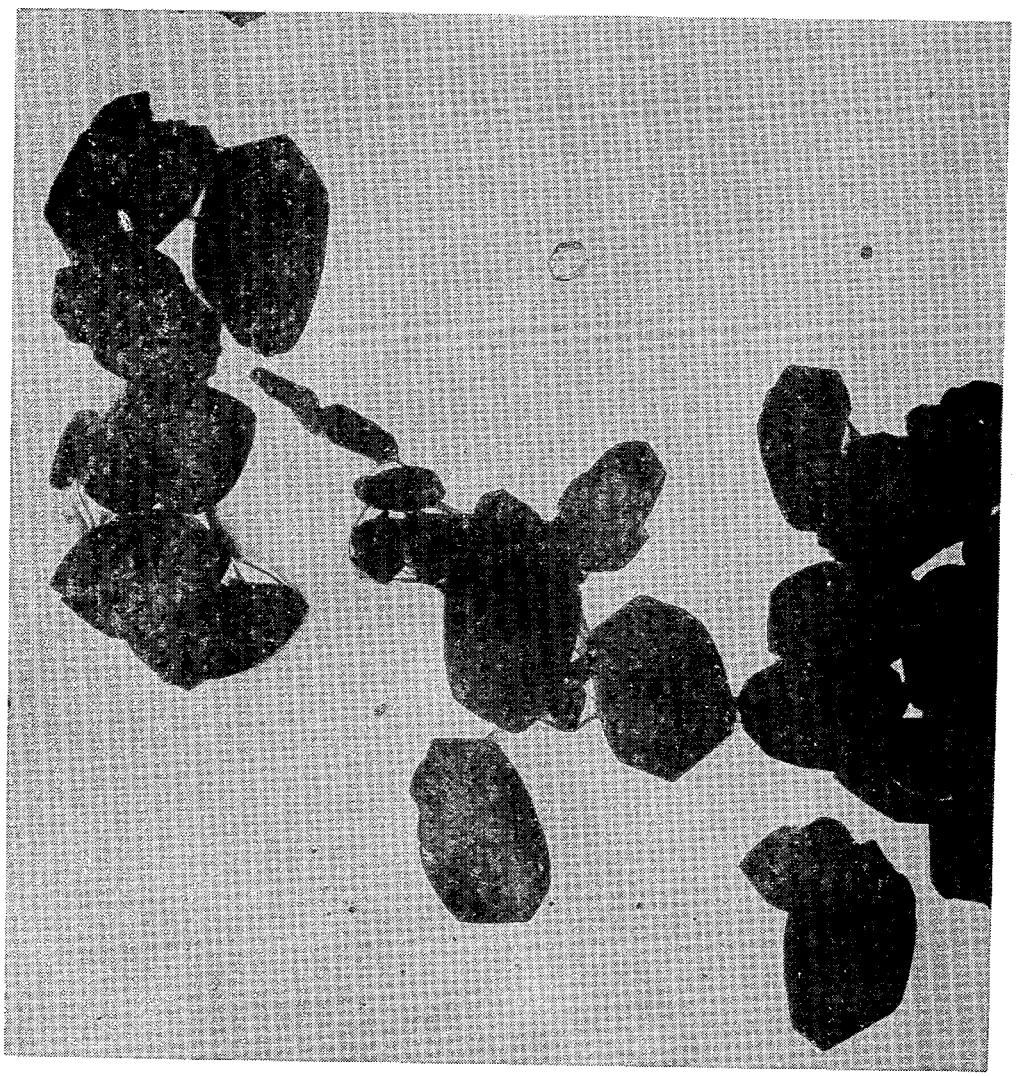

FIG. 1 depicts prior art aragonite.
FIG. 2 shows prior art vaterite.
In FIG. 3 is shown the prior art scalenohedral form of calcite.
FIG. 4 shows the prior art rhombohedral form of calcite.
FIG. 5 is an electron micrograph of the new stubby-prismatic calcite crystals of the present invention.
FIG. 6 represents a still further magnified view of these new crystals.

The novel calcite is produced by the introduction of carbon dioxide into an aqueous calcium hydroxide suspension ("carbonatation"). Calcium carbonate has been produced by such processes in the past, but the products obtained were of the conventional types mentioned. The critical process conditions required to produce the stubby-prismatic calcite crystals are newly discovered and form a part of the present invention.

In the new process, carbon dioxide is introduced into an aqueous suspension of coarse calcium hydroxide (at least about 50 weight percent of the hydroxide consisting of particles coarser than 10 microns) while maintaining the temperature below about 20° C. at least until calcite crystallization is in progress. Carbon dioxide introduction is then continued, and the temperature may be permitted to rise, while calcite crystalliaztion continues to substantial completion.

The initial temperature during calcite crystallization is critical. If carbon dioxide is introduced to the lime suspension at a temperature substantially above 20° C. there is a strong tendency to precipitate scalenohedral calcite, and at still higher temperatures, aragonite is obtained. Any temperature below 20° will be satisfactory, and excellent results are obtained at 15–16°. Once prismatic calcite crystallization is in progress, however, the temperature may be permitted to rise while crystallization of the novel product continues. Apparently the initial crystallization insures massive inoculation of the slurry with the desired crystal form, whereby this type continues to appear even at the higher temperatures where scalenohedrons might otherwise be expected. Permitting the temperature to rise during crystallization is, in fact, often desirable, to insure complete conversion of even the slow-reacting, coarser calcium hydroxide particles. A maximum crystallization temperature in the range between about 30 and 45° C. is particularly preferred, to insure complete reaction to product substantially free of other crystalline forms.

Carbonatation may be conducted in standard gas-liquid contacting equipment. For example, an agitated tank may be employed, carbon dioxide-containing gas being suitably injected beneath the agitator for thorough dispersion throughout the reaction mixture. A typical plant-scale precipitation may require one or two hours, under which circumstances it will usually be appropriate to maintain the temperature below 20° C. for about 10 or 15 minutes, by recirculating some of the slurry through a cooler. Cooling will usually be curtailed as crystallization proceeds, so that the temperature will begin to rise. When carbonate formation is about half complete the cooling can usually be halted entirely.

The carbon dioxide injected into the reaction mixture may be pure, i.e. free of other diluent gases, but this is by no means necessary. Flue gases containing about 12 volume percent or more of carbon dioxide in admixture with non-reactive gaseous diluent are suitable, although for more rapid absorption it will be preferable to employ a somewhat richer source, such as the gases from lime burning, which contain about 20–40% carbon dioxide.

At the conclusion of the process, the calcite crystals may be recovered from the aqueous suspension in discrete form. Any coarse grit or unreacted lime present are best eliminated by an initial screening of the reaction slurry through a 325 mesh U.S. sieve screen, after which the product is collected from the screened liquor by filtration or other conventional procedure. The product may upon drying, be subjected to a single pass through a hammer mill, to disintegrate any lumps and insure a uniform, free-flowing powder composed of discrete calcite crystals.

It has been stated that at least 50 weight percent of the calcium hydroxide particles employed in the process of this invention must have a diameter above about 10 microns. Electron micrographs suggest that calcium hydroxide consists of aggregate clusters of fundamental crystals about 0.01 micron in size, and the relatively large particles employed in the new process are believed to be such aggregate clusters.

Since the lime particle diameter is a somewhat inconvenient value to measure in practice, a process criterion based on settling rate has been developed. In accordance with this standard, the particle size should be such that 1000 ml. of homogeneous water suspension at 65° C. containing 150 grams of said particles exhibits a settled particle volume below about 960 ml. in a standard 1000 ml. graduated cylinder after 10 minutes' standing. That is to say, the interface between the clear supernatant water and the cloudy suspension should lie below this limit. Such a slurry is indeed a coarse suspension, in contrast to so-called "milk of lime," which typically exhibits a settled volume of 990 ml. or more in the described test. The finely divided milks have been employed almost universally in the past in general industrial practice, being favored because of their resemblance to true solutions in handling properties.

Ordinarily, lime milks are prepared by slaking reactive lime with hot water, or with limited amounts of water (with subsequent dilution if necessary), so that the exothermic reaction produces a rather high temperature, often 90–100° C. The resulting products are entirely unsatisfactory in the process of the present invention. In order to produce a calcium hydroxide suspension of the requisite coarseness for the new process, the temperature during slaking must never be permitted to exceed 65° C. It is therefore, of course, prudent to provide efficient agitation during slaking, to avoid the possibility of local overheating.

The maximum temperature during slaking will naturally vary with the initial water temperature, the quicklime: slake water ratio and the reactivity of the quicklime. (It can also be controlled, of course, by external cooling if desired.) Experience has shown that a slaking temperature below 65° C. can be assured, and particularly good results obtained, by providing water at an initial temperature of no higher than 35° C. for the slaking reaction; in addition, the quicklime:slake water ratio should preferably not exceed that which will produce about 20 grams calcium hydroxide per 100 ml. suspension. Particularly desirable is a quicklime proportion to produce a suspension containing from about 10 to 15 grams calcium hydroxide per 100 ml. suspension.

Very low quicklime proportions, i.e., those which produce a suspension containing less than about 10 grams calcium hydroxide per 100 ml., tend to be uneconomic. This disadvantage may be overcome by subsequently introducing additional lime, at least 50 weight percent of which is coarser than 10 microns, so as to raise the total calcium content to a level equivalent to about 10–20 grams of calcium hydroxide per 100 ml. suspension. The additional lime may be introduced after calcite crystallization is in progress. It will usually be in the form of a concentrated aqueous calcium hydroxide slurry, but it may be added to the reaction mixture in the form of quicklime if desired. This lime introduction may be carried out all at once, or it may be continuous, or intermittent.

A preferred quicklime for slaking in the process of the present invention is one having an activity of up to about 25° C. (30-second temperature rise) in ASTM Test C 110–58 (sections 20–22, tentative revision of June 1960). Excellent quicklimes for the purpose are those obtained from fluidized bed lime burning. Such products are granular and usually have a particle size range of about 6–30 mesh.

Turning now to the calcite crystals of novel habit produced by the process of the present invention, these are best characterized as being of stubby-prismatic, doubly terminated form. Each of the two termini comprise three clean-cut faces of a rhombohedron, and the planes of the six faces are so situated with respect to each other as to correspond to the six faces of a unit calcite rhombohedron $\{10\bar{1}1\}$ which has an interfacial angle of 75°. Between the termini lies the barrel-shaped prismatic portion of the crystal, having gently curved convex subhedral faces substantially parallel to the prismatic length. These faces are six in number, constituting a substantially vertical prism $\{10\bar{1}0\}$, which it will be appreciated, is virtually indistinguishable from an extremely steep rhombohedron, as $\{16.0.\overline{16}.1\}$. The prismatic length ranges from about one to three times the prismatic cross-sectional width, averaging about 1.5. The crystals are remarkably uniform in size, usually averaging about 1 micron in length by about 0.5–0.75 micron in width. The crystal habit is distinctive and entirely atypical in comparison with any known synthetic or naturally occurring calcite.

Owing to their uniformity and freedom from clustering, the new crystals are superior to conventional rhombohedral calcite in their ease of dispersion to ultimate particles in water, paints, rubber, polyvinyl chloride and the like. The product is especially valuable for use in paper coating.

It is generally held that the finer the particle size of the calcium carbonate, the higher the gloss of the paper coating in which it is employed. The finer particle size, however, has a high adhesive requirement, because of its increased surface area. The relatively coarse, chunky crystals of the present invention surprisingly provide unprecedented gloss, with reasonable adhesive demand. The new crystals, employed as the sole pigment, afford gloss values as high as 55% (measured at 75° from the vertical), in comparison with values of about 39% for the best commercial chalks, i.e., the rhombohedral calcites. This dramatic advantage is accompanied by a very considerable increase in printability, achieved at lower calender pressure or with fewer than customary passes through the calender rolls. "Calgon T Demand," a measure of the quantity of this polyphosphate dispersant which is required to achieve minimum viscosity of a high solids chalk slurry, is also desirably low. Even in combination with conventional forms of calcite, the stubby prismatic product affords significant advantages, provided at least about 50% by weight, and preferably 75–80% or more of the new product is present.

To reduce cost, paper-coating pigments are usually clay-based, with chalk added primarily for whiteness. Most commercial chalks are, in fact, incapable of providing the desired gloss and printability when employed alone. While the new calcite overcomes these technical disadvantages, the economic factor will often dictate its use in combination with clay for many paper-coating applications. Inorganic clay-based pigments containing at least 20% by weight of the stubby-prismatic calcite provide gloss and printability advantages, and may be formulated with binders to produce a superior coated paper. The particular binder employed has no significant effect, and any of the agents known as acceptable paper coating adhesives will be satisfactory. These include starch adhesive, modified starches, casein, and various synthetic resins such as polyvinyl acetate, polyvinyl alcohol, carboxymethylcellulose and the like.

The following examples are illustrative, and should not be interpreted as limiting the invention, the scope of which is defined by the appended claims.

*Example 1*

75 pounds of 6–40 mesh quicklime having an activity of about 17° in ASTM Test C 110–58, is added to sufficient water at 11° C. to yield a calcium hydroxide concentration of 150 g. per liter. Maximum temperature attained during slaking is 32° C. The resulting slurry exhibits a settled volume below 960 ml. after 10 minutes' standing at 65° C. in a standard one liter graduated cylinder. Wet sieve analysis shows that over 50 weight percent of the contained particles of calcium hydroxide are coarser than 10 microns, a substantial proportion being as coarse as the original quicklime.

The suspension is cooled to 16° C. and carbon dioxide is introduced, agitation and gas dispersion being effected with a shrouded impeller (Turbomixer) operating at a peripheral speed of 1000 ft. per min. When crystallization is complete the product is recovered by filtration and dried. Electrons micrographs reveal it to be composed of discrete stubby-prismatic calcite as shown in FIGS. 5 and 6.

*Example 2*

The procedure of Example 1 is repeated with water introduced to the slaking step at 50° C. instead of 11° as in the first experiment. The maximum temperature attained during slaking is 80° C.

The final calcium carbonate product dries to an exceedingly hard mass. Examined by electron micrograph, it is found to be composed of fine rhombic crystals of the type known as "rubber-grade" chalk. The crystals have the structure depicted in FIG. 4 but are of finer particle size.

*Example 3*

Quicklime is introduced to a stream of water being pumped into an agitated vessel, at such a rate that a maximum slaking temperature of 31° C. results, and there is obtained a coarse, rapid-settling suspension of 98 grams calcium hydroxide per liter.

The suspension is cooled to 16° C. by pumping through a heat exchanger, and introduction of 32% carbon dioxide is then begun, this time employing an unshrouded impeller operating at a peripheral speed of 2000 ft. per min. Cooling is continued until carbonatation is half complete; the temperature is then permitted to rise to 42° C. while crystallization continues to substantial completion. The stubby-prismatic calcite product is recovered by filtration and dried.

*Example 4*

When Example 1 is repeated employing a maximum temperature of 61.5° C. during the slaking step, a coarse rapid-settling calcium hydroxide slurry is obtained, which yields the stubby prismatic calcite upon carbonatation as described in that example.

However, in a parallel experiment employing a maximum slaking temperature of 65.5° the fine milk of lime obtained yields upon carbonatation a fine rhombic calcite like the product of Example 2.

*Example 5*

(A) A series of experiments is conducted as in the previous examples, to study the effect of the initial slake water temperature. Results are summarized below.

| Initial Slake Water Temperature, °C. | Maximum Temperature Attained During Slaking, °C. | Settled Particle Volume, ml. | Calcite Crystal Habit |
|---|---|---|---|
| 15 | 40 | 859 | New prismatic. |
| 5 | 52.5 | 918 | Do. |
| 30 | 58.0 | 922 | Do. |
| 40 | 67 | 970 | Rhombohedral. |
| 45 | 74.5 | 992 | Do. |

(B) The relation between initial slake water temperature and calcium hydroxide particle size, determined by wet sieving under carbon dioxide-free nitrogen, is observed in a second set of experiments, with results as follows:

| Initial Slake Water Temperature, °C. | Weight Percent Coarser than 10 Microns | Calcite Crystal Habit |
|---|---|---|
| 22.5 | 68.5 | New prismatic. |
| 35 | 52.3 | Do. |

*Example 6*

Quicklime of 16° ASTM activity is slaked with sufficient water at 32° C. to provide a suspension of 7.5 grams calcium hydroxide per 100 ml. The latter is then cooled to 15° C. and carbon dioxide is introduced with stirring. When prismatic calcite crystallization is in progress, a concentrated suspension of coarse calcium hydroxide in water is introduced to increase the total calcium level to one equivalent to about 10 grams of calcium hydroxide per 100 ml. of suspension. Carbonatation is continued to a maximum temperature of about 45° C. until crystallization of stubby-prismatic calcite is substantially complete.

*Example 7*

A 71% slurry of the prismatic chalk product of Example 1 in water requires 1.3% on the weight of the chalk of sodium hexametaphosphate dispersant (Calgon T, trademark of Calgon, Inc. of Pittsburgh, Pa.) for minimum viscosity. Starch adhesive, 19% of the chalk, is added to the dispersed slurry and the mixture is applied as a uniform coating on paper at the rate of 10 lbs. coating, dry basis, per ream, one side (3300 sq. ft.). After aging at least 12 hours at 72° F. and 50% relative humidity, the paper is passed through a super calender operating at 150° F. and 1500 lbs. per linear inch, with four passes of the coated surface against both the cotton-filled roll and the steel roll in alternation. A Dennison wax pick of 6A is obtained. This measure of the adequacy of adhesive level represents the highest number sealing wax which fails to detach the coating when applied molten and allowed to cool. Specular Gloss, measured at 75° from the vertical (TAPPI Standard T 480m-51), is 54.3%.

The fine rhombohedral chalks obtained in Example 2, in the second part of Example 4, and in the last two runs of Example 5A prove much more difficult to disperse. They exhibit Calgon T demands of 2.5% and more, and the resulting viscosities are usually still too great for acceptable handling properties without further dilution. Starch requirement for a wax pick of 5A-6A is usually 24% or more of the pigment weight.

Calcite compositions containing 50% or more of the stubby prismatic crystals exhibit advantageous paper-coating properties, best results being obtained with 80% by weight and higher of the new crystals.

*Example 8*

The product of Example 3 is compared to a premium quality, commercial coating-grade chalk of the rhombohedral calcite type. The two are tested in 10 lbs., 18% starch coatings having a wax pick of 5A-6A. Percent gloss is determined as a function of number of calender passes, with results as follows:

[75° Gloss, Percent]

| No. Passes Through Super Calender | Prismatic Calcite | Rhombohedral Calcite |
|---|---|---|
| 0 | 19.5 | 11 |
| 1 | 38 | 24.5 |
| 2 | 44 | 31 |
| 3 | 44 | 33 |
| 4 | 46.5 | 35 |

The rapid attainment of very high gloss with the stubby prismatic calcite is particularly advantageous, since excessive super calendering reduces paper bulk and, ultimately, printing quality.

Clay pigments are formulated with 20–45% by weight of the stubby prismatic calcite and employed to coat paper as described in Example 7. White coatings of excellent gloss, brightness and printability are obtained.

What is claimed is:

1. A process for the preparation of discrete calcite crystals of novel habit which comprises the steps of introducing carbon dioxide and thoroughly dispersing it in an aqueous calcium hydroxide suspension, said hydroxide containing at least 50 percent by weight of particles coarser than 10 microns, while maintaining the temperature below about 20° C. at least until calcite crystallization is in progress, and continuing said introduction with thorough dispersion until calcite crystallization is substantially complete.

2. The process of claim 1 wherein said temperature is permitted to rise to a value between about 30 and 45° C. during said calcite crystallization.

3. The process of claim 1 wherein said carbon dioxide is present in a concentration of at least about 12 volume percent in admixture with non-reactive gaseous diluent.

4. The process of claim 1 wherein said novel calcite crystals are recovered from said aqueous suspension and dried.

5. The process of claim 1 wherein said calcium hydroxide particle size is such that 1000 ml. of homogeneous water suspension at 65° C. containing 150 grams of said particles exhibits a settled particle volume below about 960 ml. in a standard 1000 ml. graduated cylinder after ten minutes' standing.

6. A process for the preparation of discrete calcite crystals of novel habit which comprises the steps of slaking quicklime at a temperature of up to about 65° C. to provide a coarse suspension of calcium hydroxide in water, cooling said suspension to a temperature below about 20° C., introducing carbon dioxide and thoroughly dispersing it in said suspension while maintaining the temperature below about 20° C. at least until calcite crystallization is in progress, and continuing said introduction with thorough dispersion until calcite crystallization is substantially complete.

7. The process of claim 6 wherein the temperature is permitted to rise to a value between about 30 and 45° C. during said calcite crystallization.

8. The process of claim 6 wherein said carbon dioxide is present in a concentration of at least about 12 volume percent in admixture with non-reactive gaseous diluent.

9. A process for the preparation of discrete calcite crystals of novel habit which comprises the steps of agitating quicklime until slaked with sufficient water to provide a suspension containing up to about 20 grams calcium hydroxide per 100 ml. of suspension, said water having an initial temperature of up to about 35° C., introducing carbon dioxide and thoroughly dispersing it in said suspension while maintaining the temperature below about 20° C. at least until calcite crystallization is in progress, and continuing said introduction with thorough dispersion until calcite crystallization is substantially complete.

10. The progress of claim 9 wherein said quicklime is slaked with sufficient water to provide a suspension containing from about 10 to 15 grams calcium hydroxide per 100 ml. of suspension.

11. The process of claim 9 wherein said quicklime has an activity of up to about 25° C. in ASTM Test C 110–58, Sections 20–22, Tentative Revision of June 1960.

12. The process of claim 9 wherein the temperature is permitted to rise to a value between about 30 and 45° C. during said calcite crystallization.

13. The process of claim 9 wherein said carbon dioxide is present in a concentration of at least about 12 volume percent in admixture with non-reactive gaseous diluent.

14. The process of claim 9 wherein said novel calcite crystals are recovered from said aqueous suspension and dried.

15. A process for the preparation of discrete calcite crystals of novel habit which comprises the steps of agitating quicklime until slaked with sufficient water to provide a suspension containing below about 10 grams calcium hydroxide per 100 ml. of suspension, said water having an initial temperature of up to about 35° C., introducing carbon dioxide and thoroughly dispersing it in said suspension while maintaining the temperature below about 20° C. at least until calcite crystallization is in progress, subsequently introducing additional lime at least 50 weight percent of which is coarser than 10 microns to provide a total calcium content equivalent to from about 10 to 20 grams calcium hydroxide per 100 ml. of suspension, and continuing said carbon dioxide introduction with thorough dispersion until calcite crystallization is substantially complete.

16. A calcite crystal of novel habit characterized by stubby-prismatic doubly terminated form, each of said termini consisting of three faces of a rhombohedron, all six faces belonging to one unit calcite rhombohedron of 75° interfacial angle, said prismatic portion being characterized by six gently curved convex subhedral faces substantially parallel to the prismatic length and constituting a substantially vertical prism having a length between about one and three times the prismatic cross-section width.

References Cited by the Examiner

UNITED STATES PATENTS

| | | | |
|---|---|---|---|
| 2,058,503 | 10/1936 | Rafton et al. | 23—66 |
| 2,631,922 | 3/1953 | Schur et al. | 23—66 |
| 2,964,382 | 12/1960 | Hall | 23—66 |
| 3,126,253 | 3/1964 | Podschus | 23—66 |
| 3,197,322 | 7/1965 | Maskal et al. | 23—66 X |

OSCAR R. VERTIZ, *Primary Examiner.*

G. T. OZAKI, *Assistant Examiner.*